United States Patent [19]
Crewe

[11] 3,966,012
[45] June 29, 1976

[54] AIR CUSHION VEHICLES

[75] Inventor: Peter Rowland Crewe, Newport, England

[73] Assignee: British Hovercraft Corporation Limited, Yeovil, England

[22] Filed: Feb. 20, 1975

[21] Appl. No.: 551,089

[30] Foreign Application Priority Data
Feb. 21, 1974 United Kingdom............... 8039/74

[52] U.S. Cl. .................................................. 180/127
[51] Int. Cl.² ............................................... B60V 1/16
[58] Field of Search .......... 180/116, 121, 127, 128, 180/124; 244/126

[56] References Cited
UNITED STATES PATENTS

| | | |
|---|---|---|
| 3,166,137 | 1/1965 | Cooper ............................ 180/127 |
| 3,243,004 | 3/1966 | Mackie ............................ 180/124 |
| 3,249,166 | 5/1966 | Cockerall et al. ................ 180/128 |
| 3,252,536 | 5/1966 | Jones ................................ 180/128 |
| 3,286,780 | 11/1966 | Yates ................................ 180/127 |
| 3,384,197 | 5/1968 | Bingham et al. ................. 180/128 |
| 3,481,424 | 12/1969 | Barr .................................. 180/128 |
| 3,511,331 | 5/1970 | Landry ............................. 180/127 |
| 3,677,361 | 7/1972 | Bertin .............................. 180/127 |

*Primary Examiner*—M. H. Wood, Jr.
*Assistant Examiner*—Jack D. Rubenstein
*Attorney, Agent, or Firm*—Larson, Taylor & Hinds

[57] ABSTRACT

An air cushion vehicle has a flexible skirt assembly including an inflatable bag member. When inflated, the bag member is supported by a reticulated member, so that loads acting on the bag member are transferred to the reticulated member. Preferably a buffer material is interposed between the bag member and the reticulated member to prevent chafing of the bag member by the reticulated member.

4 Claims, 1 Drawing Figure

U.S. Patent   June 29, 1976   3,966,012
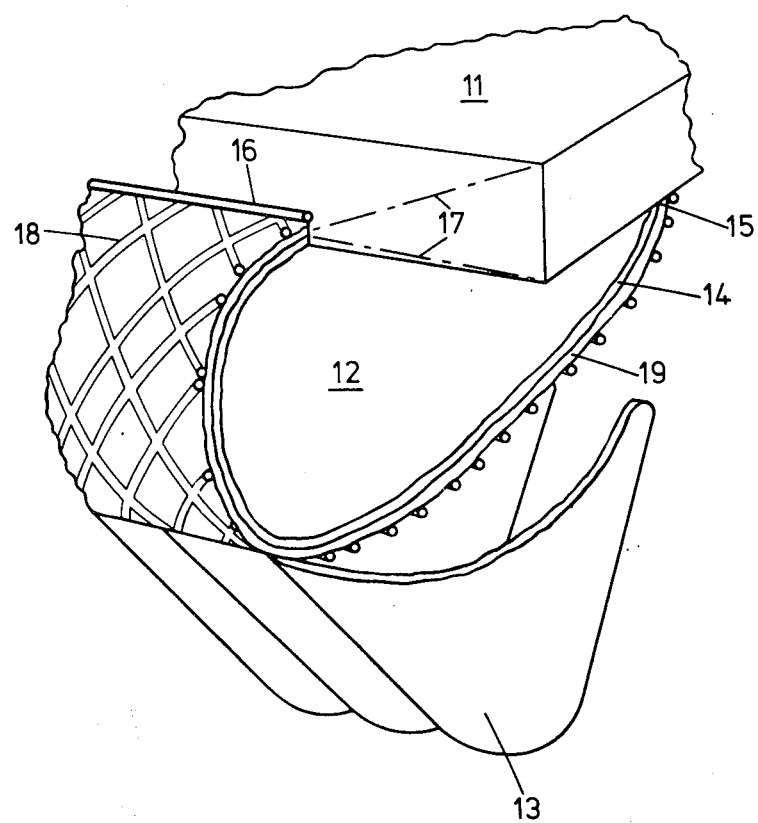

AIR CUSHION VEHICLES

This invention relates to air cushion vehicles. It is particularly concerned with a flexible skirt assembly forming at least a part of the cushion seal system for the vehicle.

It is to be understood that the term "air cushion vehicle" when used in this specification, includes any vehicle supported predominantly by a self-generated cushion of pressurized air contained between the vehicle and a surface, including surface effect ships, surface effect vehicles, and sidewall hovercraft.

It is known to provide an air cushion vehicle flexible skirt assembly comprising a bag member having attached thereto a plurality of independent flexible elements, forming a lower part of the vehicle cushion seal. The bag member is formed from flexible sheet material and is attached at its edges to rigid structure of the vehicle so that in operation it is inflated away from the rigid structure by pressurized air flowing from at least one duct formed in the rigid structure. Flexible skirt assemblies of this type are being proposed at the present time for use on very large air cushion vehicles.

As a result of dynamic movements of the vehicle, increases occur in the pressure acting within the bag member and pressure levels are reached which impose loads in the material of the bag member considerably in excess of normal loads. These loads may be further increased by water drag loads applied to the bag member by contact of the flexible skirt with a water surface over which the vehicle is operating. Furthermore, the bag member is often provided with holes through which pressurized air passes from the bag member to inflate the flexible elements forming the lower part of the cushion seal, therefore, when a vehicle fitted with such a bag member sets down on a water surface some water is able to find its way to the inside of the bag member. As the vehicle lifts off the water surface onto its cushion, the bag member may contain a considerable volume of water, and the weight of this water is carried by the bag material until such time as the water drains, or is blown, from the bag member. The larger bag member required for the skirt assembly of a very large air cushion vehicle may carry a much increased volume of water as the vehicle lifts off, thereby resulting in a very high load being applied to the bag material. In order that the bag member will withstand these high loads without failure, a very high strength flexible material is required for the bag.

Flexible materials having the necessary strengths are not available at present, and unless there is an unforeseen breakthrough in flexible material technology they will not be available in the foreseeable future.

The flexible material used in the manufacture of air cushion vehicle skirts generally comprises a woven fabric coated with a natural or synthetic rubber. The purpose of the fabric is to carry the loads generated in the skirt. The purpose of the coating is to make the fabric impermeable so that air from the vehicle cushion is unable to escape by permeating through the skirt material, and to protect the fabric from abrasion and from water contact when the vehicle operates over water. In order to increase the strength of the skirt material it has been proposed to supplement or replace the fabric material with high strength reinforcing members such as, for example, cords manufactured from steel or high tensile fibre material. This is not satisfactory, however, since stresses generated at the interfaces of the reinforcing members and the coating very quickly lead to breakdown of the skirt material.

It is an object of the present invention to provide a flexible skirt assembly which substantially overcomes these problems, thereby enabling a bag member to be used in the skirt assembly of a very large air cushion vehicle.

The present invention provides an air cushion vehicle having a flexible skirt assembly forming at least a part of a cushion seal system for the vehicle, the flexible skirt assembly including a bag member formed from flexible material, the bag member being attached to rigid structure of the vehicle so as to enclose the outlet end of a duct defined by the rigid structure of the vehicle to be in communication with a source of pressurized air on the vehicle, a flexible reticulated member attached to the vehicle so as to surround the outer surface of the bag member, the elasticity of the reticulated member being less than the elasticity of the bag member so that, in operation of the vehicle, pressurized air flowing from the duct inflates the bag member away from the rigid structure of the vehicle into contact with the reticulated member, thereby transferring some of the loading in the bag member to the reticulated member.

Relative movement between the bag member and the reticulated member during operation of the vehicle may cause chafing of the material of the bag member, therefore, in one form of the invention, a buffer material is interposed between the bag member and the reticulated member.

The reticulated member may be formed from interwoven strands of fibrous material. Alternatively, the reticulated member may be formed from interwoven metallic wires.

Preferably, the reticulated member is arranged around the bag member so that the lines formed by the net structure of the reticulated member bisect at angles other than normal a substantially horizontal line extending parallel with the longitudinal run of the skirt assembly.

One embodiment of the invention will now be described, by way of example only, with reference to the accompanying drawing.

An air cushion vehicle, which is not illustrated in full, has a flexible skirt assembly forming a part of the cushion seal system. The drawing shows a diagrammatic perspective view of part of the flexible skirt assembly which includes a bag member 12 formed from flexible impermeable sheet material 14. The bag member 12 is attached to rigid understructure 11 of the vehicle along an attachment line 15. The bag member 12 is also attached along an attachment line 16 to rigid structure (not shown) spaced from the understructure 11 by rigid struts, represented by chain lines 17, to form the outlet end of a duct (not shown) which communicates with a lift fan (not shown) for producing a flow of pressurized air.

A reticulated member 18 is attached to the rigid structure of the vehicle at, or adjacent to, the attachment lines 15 and 16 so as to surround the outer surface of the sheet material 14 from which the bag member 12 is formed. A sheet of buffer material 19, which may be of fibrous or foam construction, is interposed between the reticulated member 18 and the bag member 12 so that chafing between the bag member 12 and the reticulated member 18 is prevented.

A plurality of independent flexible elements 13, known in the art as segments or fingers, are attached to the bag member 12 so as to form the lower part of the cushion seal.

The reticulated member 18 is constructed from steel wires interwoven to form a net. The steel wires have a lower elasticity than the flexible sheet material 14 from which the bag member 12 is formed. Therefore, when the bag member 12 is inflated away from the rigid structure of the vehicle by pressurized air flowing through the duct (not shown), some of the load in the bag member 12 is transferred into the reticulated member 18.

The major loads acting on the bag member are hoop loads and catenary loads. To ensure that both of these loads are transferred into the reticulated member, the member is arranged around the bag member such that the steel wires making up the net structure bisect a substantially horizontal line, extending parallel with the longitudinal run of the skirt assembly at angles which are other than normal, the preferred angle being 45°.

In a large air cushion vehicle having a flexible skirt including a bag member supported by a reticulated member, in accordance with the present invention, the bag member can be manufactured from conventional flexible materials and is able to withstand the high loads to which it may be subject during operation, since these loads are transferred to the reticulated member. The loads in the reticulated member are then transferred back to the rigid structure of the vehicle.

Of course this embodiment has been described by way of example only, and a number of modifications can be made without departing from the scope of the invention. For instance, the reticulated member may be made from materials other than steel wire, one example of a suitable alternative material being high strength polyamide. As another alternative, the reticulated member may be manufactured from interwoven high strength fibrous material, the major considerations being that the material has sufficient tensile strength and an elasticity which is less than that of the material from which the bag member is manufactured.

I claim as my invention:

1. In an air cushion vehicle having a flexible skirt assembly forming at least a part of a cushion seal system for the vehicle, the flexible skirt assembly including a bag member formed from flexible material, the bag member being attached to rigid structure of the vehicle so as to enclose the outlet end of a duct defined by the rigid structure of the vehicle to be in communication with a source of pressurized air on the vehicle, the improvement comprising a flexible reticulated member attached to the vehicle so as to surround the outer surface of the bag member, the elasticity of the reticulated member being less than the elasticity of the bag member so that, in operation of the vehicle, pressurized air flowing from the duct inflates the bag member away from the rigid structure of the vehicle into contact with the reticulated member, thereby transferring some of the loading in the bag member to the reticulated member, and a sheet of buffer material interposed between the bag member and the reticulated member for preventing chafing between the two members and the reticulated member being arranged around the bag member so that the lines formed by the net structure of the reticulated member bisect a substantially horizontal line extending parallel with the longitudinal run of the skirt assembly at angles other than normal.

2. An air cushion vehicle as claimed in claim 1 wherein the reticulated member is formed from interwoven strands of fibrous material.

3. An air cushion vehicle as claimed in claim 1 wherein the reticulated member is formed from interwoven metallic wires.

4. An air cushion vehicle as claimed in claim 1 wherein a plurality of flexible skirt elements are attached to the bag member so as to form a lower part of the cushion seal.

* * * * *